US012330171B2

(12) United States Patent
Guandalini et al.

(10) Patent No.: US 12,330,171 B2
(45) Date of Patent: Jun. 17, 2025

(54) DECANTER CENTRIFUGES AND ASSOCIATED ACCELERATION PIPES AND METHODS

(71) Applicant: Schlumberger Technology Corporation, Sugar Land, TX (US)

(72) Inventors: Luciano Guandalini, Occhiobello Rovigo (IT); Gocha Chochua, Sugar Land, TX (US); Marco Bergonzoni, Occhiobello Rovigo (IT); Leonardo Renzo Vicentini, Occhiobello Rovigo (IT)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 803 days.

(21) Appl. No.: 17/560,585

(22) Filed: Dec. 23, 2021

(65) Prior Publication Data

US 2022/0212205 A1 Jul. 7, 2022

(30) Foreign Application Priority Data

Jan. 4, 2021 (IT) ........................ 102021000000035

(51) Int. Cl.
*B04B 1/20* (2006.01)

(52) U.S. Cl.
CPC .... *B04B 1/2016* (2013.01); *B04B 2001/2033* (2013.01)

(58) Field of Classification Search
CPC .......... B04B 1/2016; B04B 2001/2033; B04B 11/02; B04B 1/20
See application file for complete search history.

(56) References Cited

U.S. PATENT DOCUMENTS 5,971,907 A * 10/1999 Johannemann ........... B04B 1/20 494/37
7,032,759 B2 * 4/2006 Reinach .................. B04B 11/06 210/372
2002/0132718 A1 * 9/2002 Koch ........................ B04B 1/20 494/53

FOREIGN PATENT DOCUMENTS

WO WO-9113686 A1 * 9/1991 ............... B04B 1/20
WO 03082474 A2 10/2003

OTHER PUBLICATIONS

Search Report and Opinion issued in Italian Patent Application 102021000000035 on Sep. 14, 2021, 10 pages.

* cited by examiner

*Primary Examiner* — Krishnan S Menon
*Assistant Examiner* — Shuyi S. Liu
(74) *Attorney, Agent, or Firm* — Jeffrey D. Frantz

(57) ABSTRACT

Decanter centrifuges and associated acceleration pipes and methods are provided. In accordance with an example, an acceleration pipe for use with a decanter centrifuge including a feed pipe and a screw conveyor having an acceleration chamber includes an acceleration pipe body adapted to be coupled to and rotate with the screw conveyor. The acceleration pipe body includes an acceleration pipe inlet and an acceleration pipe outlet. The acceleration pipe body defines an acceleration pipe flow path extending between the acceleration pipe inlet and the acceleration pipe outlet. The acceleration pipe body is adapted to receive a suspension at the acceleration pipe inlet from the feed pipe and to rotate the suspension, based on a corresponding rotation of the screw conveyor, prior to the suspension exiting the acceleration pipe outlet and being received by the acceleration chamber of the screw conveyor.

20 Claims, 6 Drawing Sheets

DECANTER CENTRIFUGES AND ASSOCIATED ACCELERATION PIPES AND METHODS

CROSS-REFERENCE TO RELATED APPLICATIONS

This application claims priority from Italian Patent Application No. 102021000000035, filed on Jan. 4, 2021, the entire disclosure of which is incorporated herein by reference.

BACKGROUND

Drilling fluids may be used in hydrocarbon drilling processes to maintain the structural integrity of the borehole, cool the drill bit, and/or carry cuttings from the drill bit to the surface. To remove cuttings from the drilling fluid for reuse, decanter centrifuges may be used to separate phases of a suspension including drilling fluid and cuttings.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Moreover, examples herein are intended to be illustrative only and are presented for discussion purposes and not by way of limitation.

The examples disclosed herein relate to decanter centrifuges having acceleration pipes that are used to rotate a suspension including drilling fluid/cuttings. The suspension may be referred to as a slurry or a mixture. The acceleration pipe rotates the suspension prior to the suspension being received within an acceleration chamber of the decanter centrifuge. Imparting rotational motion to the suspension prior to the suspension being received within the acceleration chamber allows the acceleration chamber to more easily bring the suspension to a desired rotational speed for separation to occur and allows for the centrifuges to work less or be more efficient at achieving a threshold separation result.

Additionally, providing the decanter centrifuges with the acceleration pipes allows for feed pipes that are used to flow the suspension into the centrifuge to extend a lesser length into a drum of the centrifuge. Reducing the length of the feed pipe may reduce the likelihood that the feed pipe achieves a resonance that may cause the feed pipe to come into contact with rotating components of the decanter centrifuge. Reducing the length of the feed pipe may also reduce the likelihood that solids buildup within the decanter centrifuge urge the feed pipe into contact with these rotating components of the centrifuge. Contact between the feed pipe and the rotating components of the centrifuge may damage the feed pipe or otherwise cause down time. Thus, by providing decanter centrifuges with the example acceleration pipes, the disclosed examples allow centrifuges to more easily rotate a suspension more efficiently as compared to some prior art examples and/or reduce unscheduled downtime due to maintenance.

Figure 1:
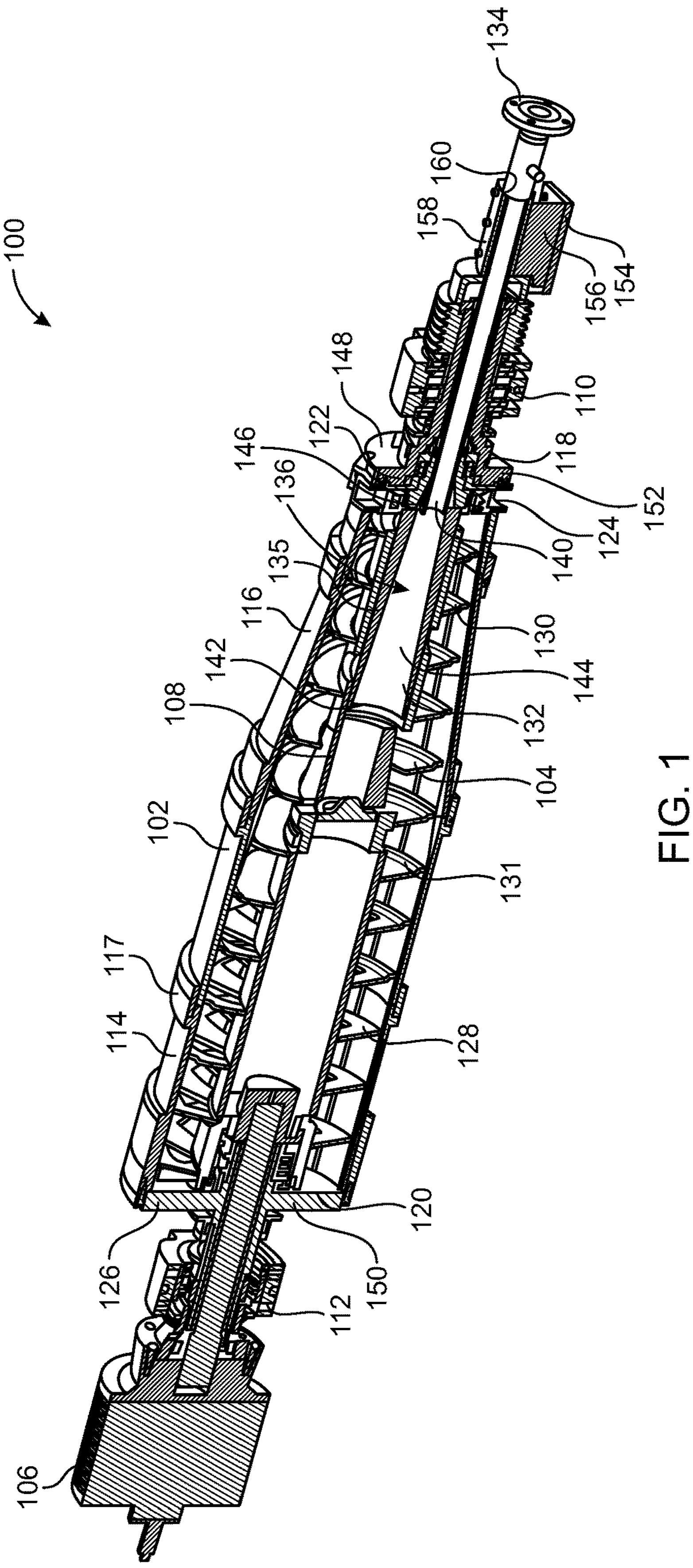
FIG. 1 is an isometric cross-sectional view of a decanter centrifuge in accordance with a first example of the present disclosure.

Referring now to the drawings, FIG. 1 is a cross-sectional isometric view of a decanter centrifuge 100 in accordance with a first example of the present disclosure. In the example shown, the decanter centrifuge 100 includes a drum 102, a screw conveyor 104, a drive assembly 106, and an acceleration chamber 108.

The drum 102 is mounted for rotation. In the example shown, the drum 102 is journaled between a pair of pillow blocks 110, 112. The pillow blocks 110, 112 may be coupled to a stand or other support structure.

The drum 102 includes a cylindrical portion 114 and a frustoconical portion 116. The cylindrical portion 114 and the frustoconical portion 116 are coupled at a flanged interface 117. Fasteners may be used to couple the cylindrical portion 114 and the frustoconical portion 116. Other methods may be used to couple the cylindrical portion 114 and the frustoconical portion 116. For example, the cylindrical portion 114 and the frustoconical portion 116 may be welded at the flanged interface 117.

The drum 102 has a first drum end 118 and a second drum end 120. The drum 102 also includes a drum inlet 122, one or more solids outlets 124, and a liquid outlet 126. In one or more embodiments, the drum 102 may include a plurality of solids outlets 124 radially spaced about the drum 102. However, the present disclosure is not limited thereto and in other embodiments, the plurality of solids outlet 124 may be differently arranged.

The drum inlet 122 and the solids outlet 124 are positioned adjacent the first drum end 118, and the liquid outlet 126 is positioned adjacent the second drum end 120. In other examples, the drum inlet 122, the solids outlet 124, and/or the liquid outlet 126 may be differently arranged. For example, the liquid outlet 126 may be on the same end as the drum inlet 122, and the solids outlet 124 may be on a different side as the drum inlet 122.

The screw conveyor 104 is rotatably mounted within the drum 102. The screw conveyor 104 includes a helical screw blade 131. In the example shown, the screw conveyor 104 has a cylindrical portion 128 disposed within the cylindrical portion 114 of the drum 102 and a frustoconical portion 130 disposed within the frustoconical portion 116 of the drum 102.

The drive assembly 106 is operatively coupled to the drum 102 and the screw conveyor 104. The drive assembly 106 may be a planetary gear assembly. In some examples, the drive assembly 106 is arranged to rotate the drum 102 at a first speed and the screw conveyor 104 at a second speed.

The acceleration chamber 108 is disposed within the drum 102 and arranged to rotate with the screw conveyor 104. The acceleration chamber 108 may be centrally positioned between the first drum end 118 and the second drum end 120 and is arranged to receive a suspension fed into the drum 102. The acceleration chamber 108 may be adapted to accelerate the received suspension to a rotational speed associated with separating phases of the suspension (e.g., liquids from solids).

In the example shown, the centrifuge 100 also includes an acceleration pipe 132 and a feed pipe 134. The acceleration pipe 132 has an acceleration pipe body 135. The acceleration pipe 132 is coupled to the screw conveyor 104 and is arranged to rotate with the screw conveyor 104. The acceleration pipe 132 is disposed between the drum inlet 122 and the acceleration chamber 108.

The feed pipe 134 is in flow communication with the acceleration chamber 108, via the drum inlet 122 and the acceleration pipe 132. A flow path 136 runs from the feed pipe 134, through the acceleration pipe 132, to the acceleration chamber 108.

In operation, the acceleration pipe 132 is adapted to receive a suspension from the feed pipe 134 and to rotate the suspension, based on corresponding rotation of the screw conveyor 104, prior to the suspension exiting the acceleration pipe 132 and being received by the acceleration chamber 108. The acceleration pipe 132 acts as a radial accelerator that provides the suspension with an initial and gradual radial motion prior to the suspension being received by the acceleration chamber 108. Because the acceleration pipe 132 is coupled to rotate with the screw conveyor 104, rotating the screw conveyor 104 also rotates the acceleration pipe 132.

Still referring to FIG. 1, the acceleration pipe 132 includes an acceleration pipe inlet 140, an acceleration pipe outlet 142, and an acceleration pipe flow path 144. The acceleration pipe flow path 144 extends between the acceleration pipe inlet 140 and the acceleration pipe outlet 142. In the example shown, a feed pipe outlet 146 is disposed within or immediately adjacent the acceleration pipe inlet 140. Additionally, in the example shown, the feed pipe outlet 146 is spaced from the acceleration pipe outlet 142. Thus, the feed pipe outlet 146 is closer to the acceleration pipe inlet 140 than the acceleration pipe outlet 142. As a result, the feed pipe 134 is arranged to flow the suspension into the acceleration pipe flow path 144 and the acceleration pipe 132 is arranged to flow the suspension into the acceleration chamber 108.

In the example shown, a solids hub 148 is coupled to the first drum end 118 and a liquids hub 150 is coupled at the second drum end 120. The solids hub 148 may be coupled to the first drum end 118 via a flanged interface 152. Fasteners may be used to couple the liquids hub 150 to the drum 102.

The feed pipe 134 is shown being coupled to the solids hub 148. The feed pipe 134 extends through a feed pipe support 154. The feed pipe support 154 includes a bottom portion 156 and a top portion 158. The bottom portion 156 and the top portion 158 are coupled using fasteners and define a support through hole 160. The feed pipe 134 extends through the support through hole 160 and is clamped within the feed pipe support 154.

Figure 2:
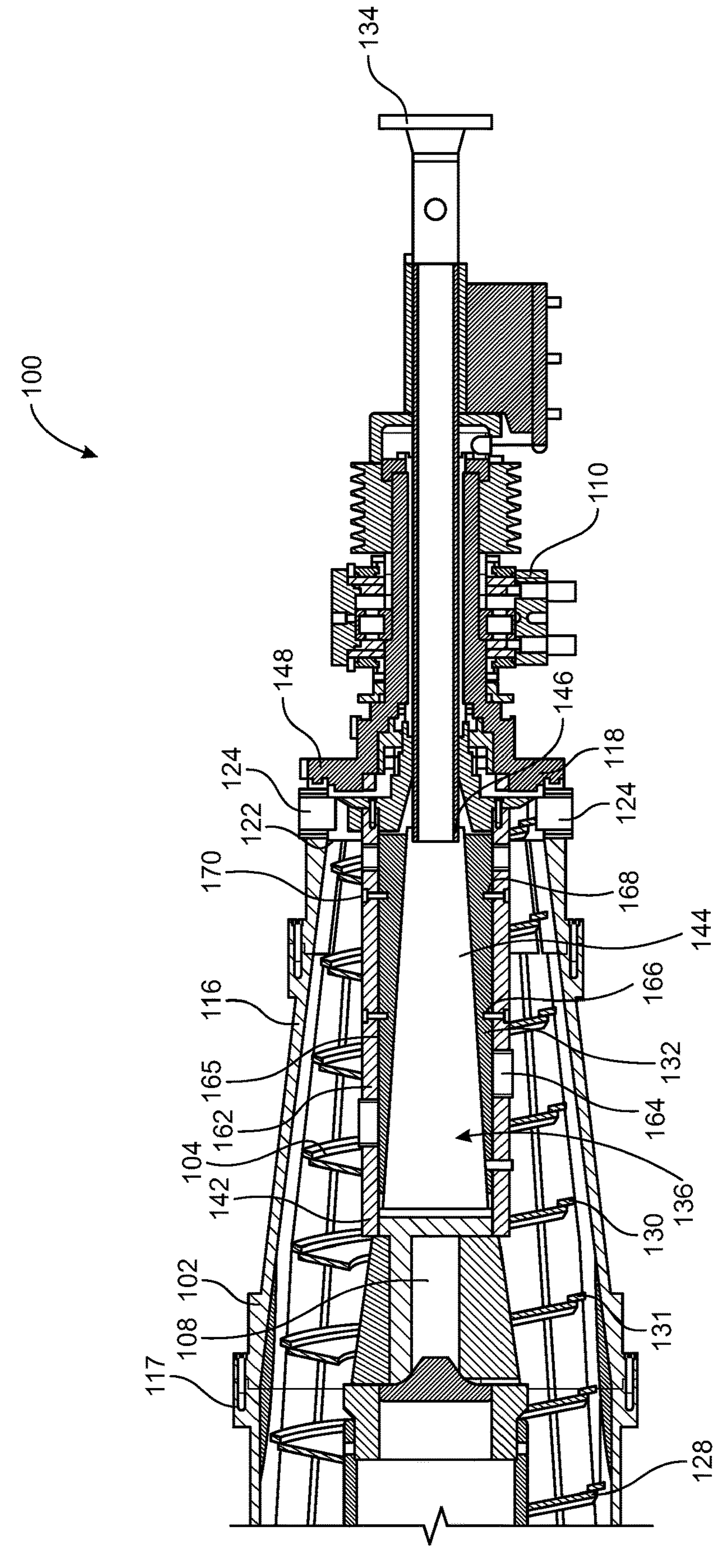
FIG. 2 is a cross-sectional view of a portion of the decanter centrifuge of FIG. 1.

FIG. 2 is a cross-sectional view of a portion of the decanter centrifuge 100 of FIG. 1. In the example shown, the screw conveyor 104 includes a hub 162. The acceleration pipe 132 is coupled within the hub 162. The hub 162 may be cylindrical and may be referred to as a conveyor.

In the example shown, the hub 162 includes a plurality of radial hub holes 164. When the centrifuge 100 is operated without the acceleration pipe 132 installed, the radial hub holes 164 may be used in association with barite recovery. When the acceleration pipe 132 is installed within the hub 162, as shown, the acceleration pipe 132 covers the radial hub holes 164. As a result of the acceleration pipe 132 covering the radial hub holes 164, when the acceleration pipe 132 is received within the hub 162, the hub 162 and the radial hub holes 164 may not be used for barite recovery. In other examples, such as the example shown in FIG. 5, the hub 162 may not include the radial hub holes 164.

Still referring to FIG. 2, the acceleration pipe 132 includes an exterior surface 165 that defines mounting holes 166. The mounting holes 166 may be referred to as locating holes. The hub 162 includes corresponding mounting holes 168. In the example shown, a fastener 170 is received within each of the mounting holes 166 to couple the acceleration pipe 132 to the hub 162.

Figure 6:
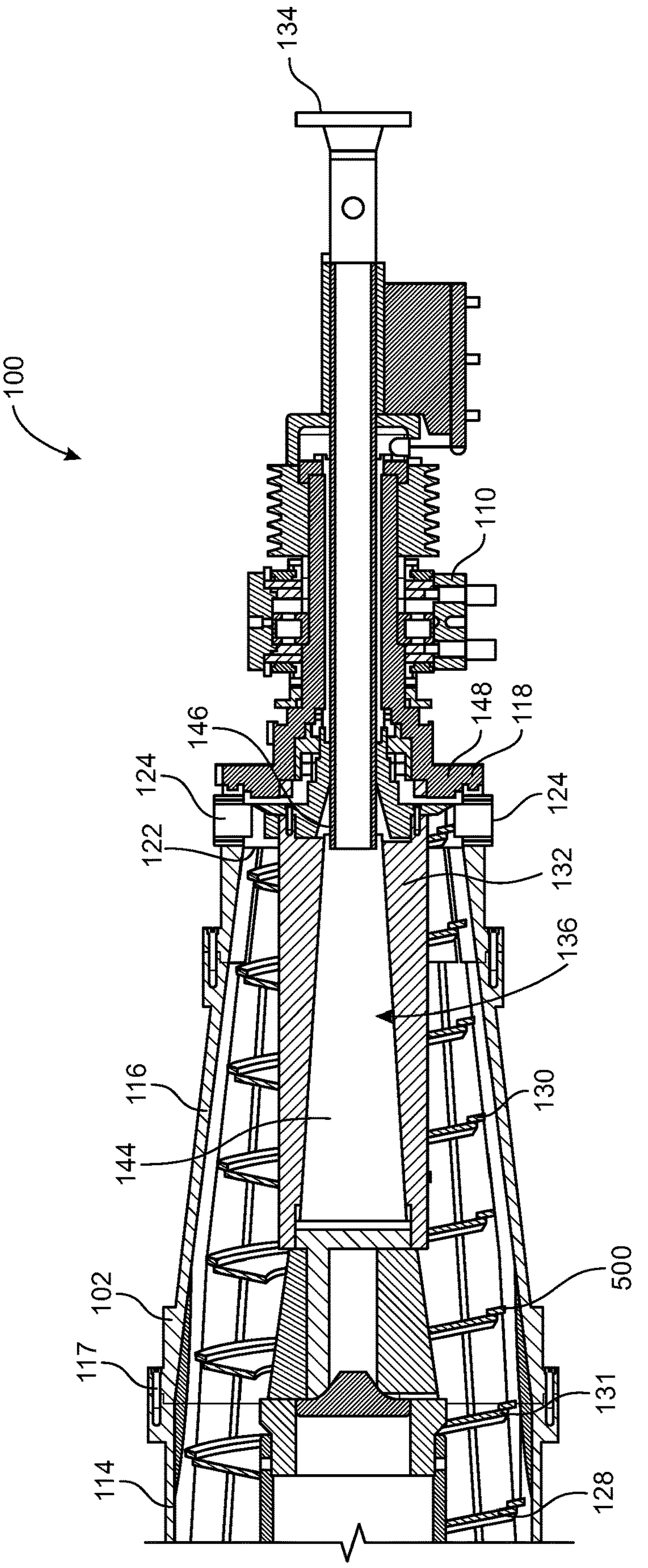
FIG. 6 is a cross-sectional view of a portion of the decanter centrifuge of FIG. 1 including another example of a screw conveyor.

The mounting holes 166, 168 may be threaded and the fastener 170 may be a screw. Coupling the acceleration pipe 132 within the hub 162 using screws (or another removable fastener) allows the acceleration pipe 132 to be removed for cleaning or other reasons. Additionally, coupling the acceleration pipe 132 within the hub 162 using screws (or another removable fastener) allows the centrifuge 100 to be provided with the acceleration pipe 132 during separating operations that do not involve barite recovery and allows the centrifuge 100 to operate without the acceleration pipe 132 during separating operations that involve barite recovery. While the fasteners 170 are mentioned coupling the acceleration pipe 132 within the hub 162, the acceleration pipe 132 may be coupled within the hub 162 in different ways. For example, the acceleration pipe 132 may be welded within the hub 162, dowel rods may be pounded into the mounting holes 166, 168 to provide an interference fit, etc. As another example, the hub 162 and the acceleration pipe 132 may be integral as shown in FIG. 6.

To retrofit the centrifuge 100 to include the acceleration pipe 132, in some examples, a longer feed pipe (not shown) is uncoupled from the solids hub 148. Prior to uncoupling the longer feed pipe from the solids hub 148, a feed pipe outlet of the longer feed pipe may be positioned to directly flow a suspension into the acceleration chamber 108 of the screw conveyor 104. Thus, the removed longer feed pipe may extend further into the screw conveyor 104 than the feed pipe 134 shown in FIG. 2.

The solids hub 148 may be uncoupled from the first drum end 118. Uncoupling the solids hub 148 from the drum 102 provides access to an interior of the drum 102.

The acceleration pipe 132 may be coupled within the screw conveyor 104 to rotate with the screw conveyor 104. In the example shown, the acceleration pipe 132 is coupled within the screw conveyor 104 using the fasteners 170.

The solids hub 148 is recoupled to the first drum end 118, and the feed pipe 134 is coupled to the solids hub 148 to allow the feed pipe outlet 146 to flow the suspension into the acceleration pipe 132 prior to the suspension being received by the acceleration chamber 108. In some examples, the feed pipe 134 is formed by shortening the length of the longer feed pipe used with the centrifuge 100 prior to the retrofit process occurring. In some examples, the centrifuge 100 is balanced. The balancing process may be performed after the acceleration pipe 132 is coupled within the screw conveyor 104.

Figure 3:
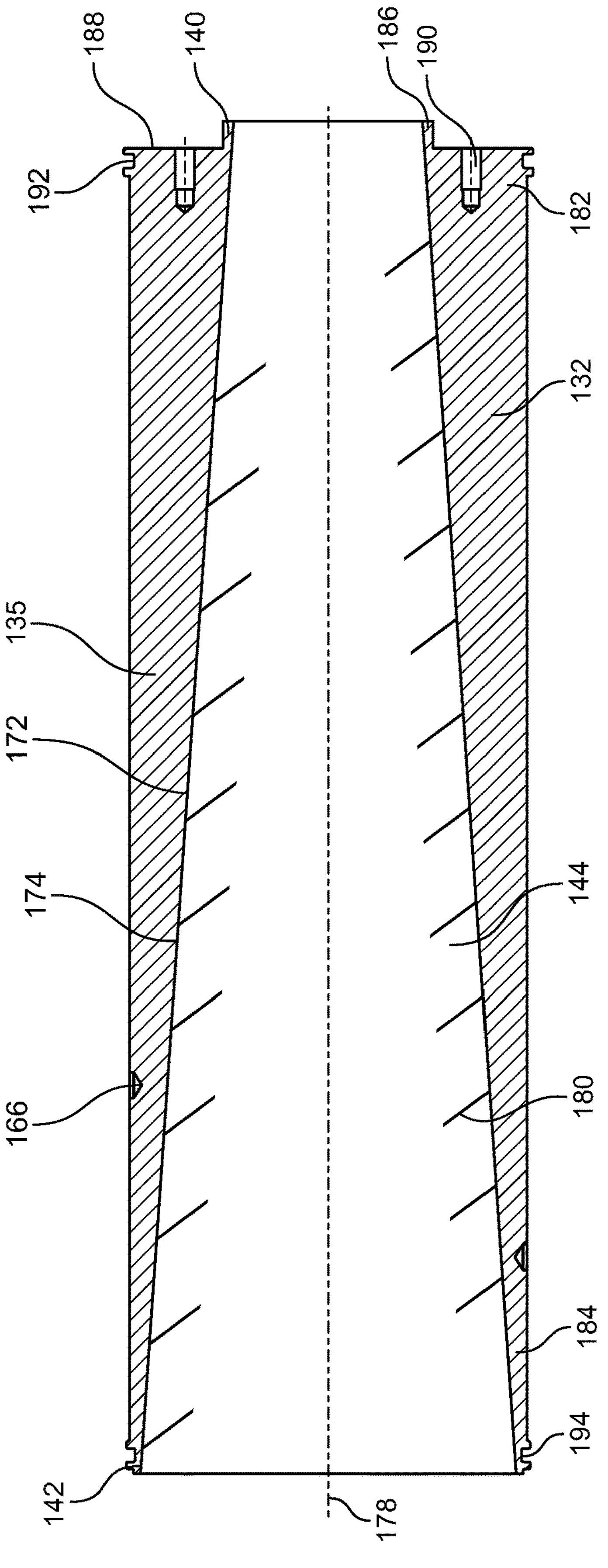
FIG. 3 is a cross-sectional view of the acceleration pipe of the decanter centrifuge of FIG. 1.

FIG. 3 is a cross-sectional view of the acceleration pipe 132 of the centrifuge 100 of FIG. 1. In the example shown, the acceleration pipe body 135 is integral. As another example, the acceleration pipe body 135 may be formed of more than one component that are coupled together (see, for example, FIG. 4).

The acceleration pipe 132 includes an interior surface 172 that defines the acceleration pipe flow path 144. The interior surface 172 extends between the acceleration pipe inlet 140 and the acceleration pipe outlet 142. The interior surface 172 is inwardly tapered toward the acceleration pipe inlet 140. Inwardly tapering the interior surface 172 may deter or otherwise prevent backflow of the suspension within the acceleration pipe 132. Put another way, inwardly tapering the interior surface 172 encourages fluid flow from the acceleration pipe inlet 140 to the acceleration pipe outlet 142. The interior surface 172 widens toward the acceleration pipe outlet 142.

Figure 4:
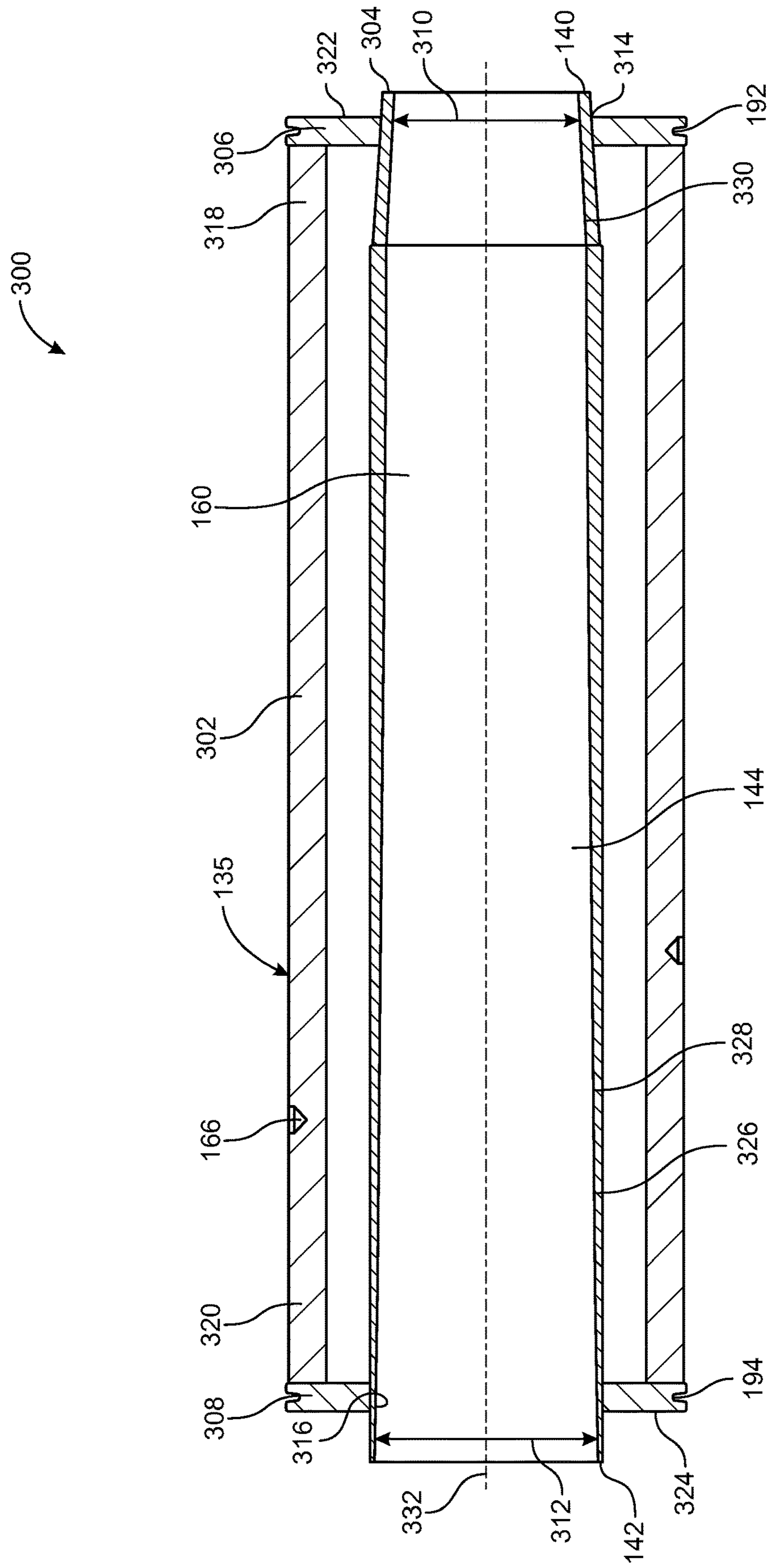
FIG. 4 is a cross-sectional view of another example of an acceleration pipe that can be used with the decanter centrifuge of FIG. 1.

The interior surface 172 may be frustoconical. In the example shown, the interior surface 172 is inwardly tapered at a relatively consistent slope between the acceleration pipe outlet 142 and the acceleration pipe inlet 140. The interior surface 172 may have a tapered surface 174 having an angle of between about 0.5 degrees and about 6 degrees relative to a longitudinal axis 178 of the acceleration pipe 132. Specifically, in the example shown, the tapered surface 174 has an angle of about 4.0 degrees. Other angles may prove suitable. For example, the tapered surface 174 may have an angle relative to the longitudinal axis 178 of less than about 0.5 degrees or greater than about 6 degrees. As another example and as shown in FIG. 4, the interior surface 172 of the acceleration pipe 132 may include more than one tapered surface.

The interior surface 172 may include projections 180. The projections 180 may be adapted to encourage the flow of the suspension from the acceleration pipe inlet 140 to the acceleration pipe outlet 142 and/or the projections 180 may be adapted to impart rotation to the suspension. The projections 180 may include inwardly extending helical fins, flights, and/or ribs. However, other types of projections may prove suitable or the projections 180 may be eliminated.

The acceleration pipe 132 includes an inlet end 182 and an outlet end 184. A collar 186 extends from a face 188 at the inlet end 182 of the acceleration pipe 132. The collar 186 may have a circular cross-section and is shown defining at least part of the acceleration pipe inlet 140. In other examples, the collar 186 may extend further or less from the face 188 or the collar 186 may be eliminated.

Mounting holes 190 may be defined by the face 188 at the inlet end 182 of the acceleration pipe 132. The mounting holes 190 may be used to secure the acceleration pipe 132 within the screw conveyor 104. For example, fasteners may be received by the mounting holes 190 to secure the acceleration pipe 132 relative to the solids hub 148.

In the example shown, the exterior surface 165 includes a circumferential groove 192, 194 adjacent each of the inlet end 182 and the outlet end 184 of the acceleration pipe 132. The circumferential grooves 192, 194 may be used to locate the acceleration pipe 132 within the hub 162 and/or may be used to otherwise secure the acceleration pipe 132 relative to the screw conveyor 104. In some examples, the circumferential grooves 192, 194 are adapted to receive gaskets. The gaskets may sealingly engage an interior surface of the hub 162. The engagement between the gaskets and the interior surface of the hub 162 may deter the ingress of fluid and/or may encourage alignment of the acceleration pipe 132 within the hub 162. In other examples, the grooves 192, 194 may be eliminated.

FIG. 4 is a cross-sectional view of another example of an acceleration pipe 300 that can be used with the decanter centrifuge 100 of FIG. 1. The acceleration pipe 300 of FIG. 4 is similar to the acceleration pipe 132 shown in FIGS. 1-3. However, in contrast, the acceleration pipe 300 of FIG. 4 includes an outer body 302, an inner body 304, and a pair of end caps 306, 308.

The inner body 304 includes the acceleration pipe inlet 140, the acceleration pipe outlet 142, and the acceleration pipe flow path 144. In the example shown, the acceleration pipe inlet 140 has a first diameter 310 and the acceleration pipe outlet 142 has a second diameter 312 larger than the first diameter 310.

The end caps 306, 308 define through holes 314, 316 and are coupled at ends 318, 320 of the outer body 302. The end caps 306, 308 may be coupled to the ends 318, 320 of the outer body 302 using fasteners, adhesive, welding, etc. Other methods of coupling the end caps 306, 308 to the outer body 302 may prove suitable.

In the example shown, the inner body 304 extends through the outer body 302 and out of the through holes 314, 316 of the end caps 306, 308. More specifically, the acceleration pipe inlet 140 and the acceleration pipe outlet 142 extend from outward faces 322, 324 of the corresponding end caps 306, 308. While the acceleration pipe inlet 140 and the acceleration pipe outlet 142 are shown extending from the end caps 306, 308 a particular amount and form, for example, collars, in other examples, the acceleration pipe 300 may be a different length. For example, the acceleration pipe inlet 140 and/or the acceleration pipe outlet 142 may extend further or less from the end caps 306, 308 or may end flush with the end caps 306, 308.

The inner body 304 includes an interior surface 326 that inwardly tapers toward the acceleration pipe inlet 140. Specifically, in the example shown, the inner body 304 includes a first tapered portion 328 having a first taper and a second tapered portion 330 having a second taper. The first tapered portion 328 and the second tapered portion 330 may be frustoconical and, thus, may be referred to as frustoconical portions. The first and second tapers are different. The first tapered portion 328 and the second tapered portion 330 may each have an angle of between about 0.5 degrees and about 6 degrees relative to a longitudinal axis 332 of the acceleration pipe 300. In the example shown, the first tapered portion 328 may have an angle of about 0.5 degrees relative to the longitudinal axis 332. In the example shown, the second tapered portion 330 may have an angle of about 2.86 degrees relative to the longitudinal axis 332. Other angles may prove suitable. For example, the first tapered portion 328 and/or the second tapered portion 330 may each have an angle of less than about 0.5 degrees or an angle greater than about 6 degrees relative to the longitudinal axis 332. While the first tapered portion 328 and the second tapered portion 330 are shown having a particular length, the tapered portions 328, 330 may include different lengths. For example, the tapered portions 328, 330 may have similar lengths relative to one another such that an interface between the tapered portions 328, 330 is positioned in the middle of the acceleration pipe 300. In other examples, more than two frustoconical portions may be included.

Figure 5:
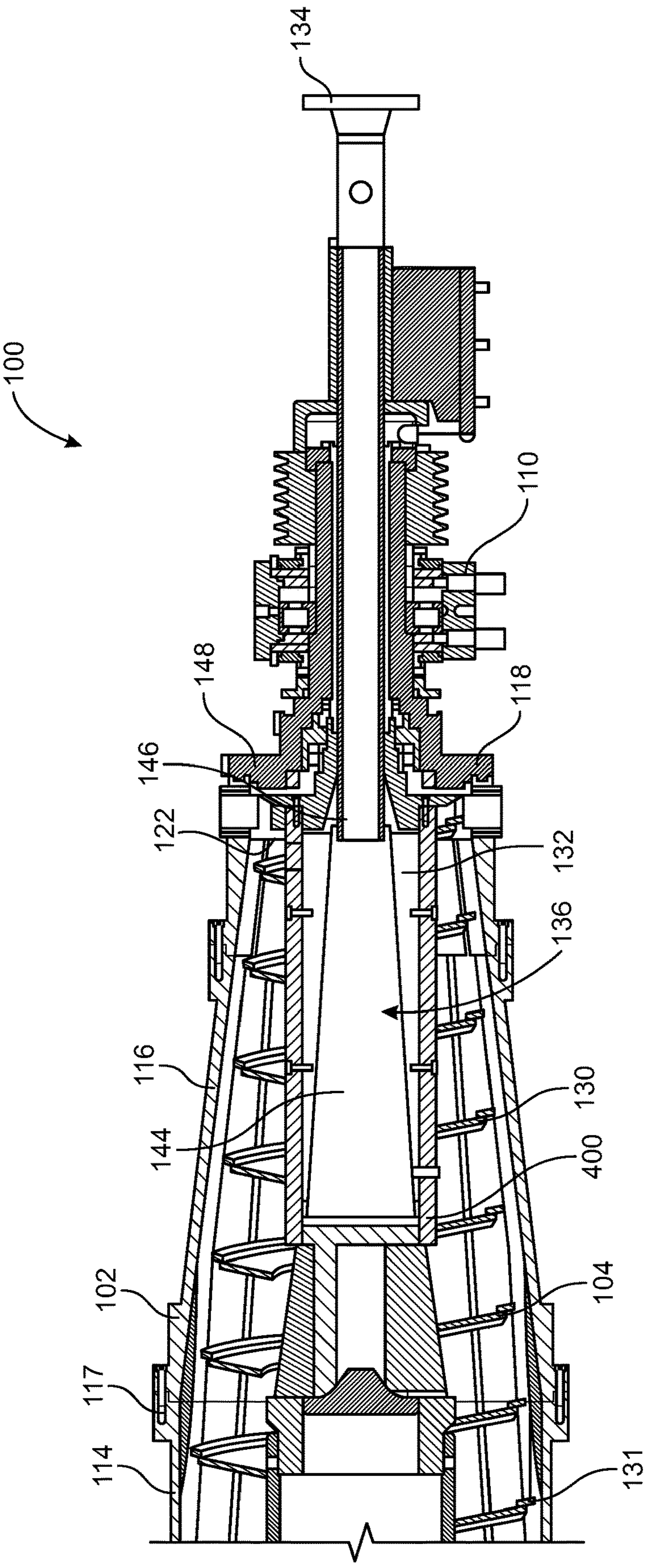
FIG. 5 is a cross-sectional view of a portion of the decanter centrifuge of FIG. 1 including another example of a hub of a screw conveyor.

FIG. 5 is a cross-sectional view of a portion of the decanter centrifuge 100 of FIG. 1 including another example of a hub 400 of the screw conveyor 104. The hub 400 of FIG. 5 is similar to the hub 162 of FIGS. 2 and 3. However, in contrast, the hub 400 of FIG. 5 does not include the radial hub holes 164. As a result, the centrifuge 100 of FIG. 5 may not be used for barite recovery in a similar manner as the centrifuge 100 of FIG. 2.

FIG. 6 is a cross-sectional view of a portion of the decanter centrifuge 100 of FIG. 1 including another example of a screw conveyor 500. The screw conveyor 500 of FIG. 6 is similar to the screw conveyor 104 of FIG. 5. However, in contrast, the screw conveyor 500 of FIG. 6 includes the acceleration pipe 132. Thus, the screw conveyor 500 of FIG. 6 and the acceleration pipe 132 are shown being integral.

From the foregoing, it will be appreciated that the above disclosed apparatus, methods and articles of manufacture enable suspensions to be rotated prior to being received within an acceleration chamber of a corresponding decanter centrifuge.

In accordance with one example, a decanter centrifuge includes a drum, a screw conveyor, a drive assembly, an acceleration chamber, an acceleration pipe, and a feed pipe. The screw conveyor includes a cylindrical portion and a frustoconical portion. The drum includes a drum inlet, a solids outlet, and a liquid outlet. The screw conveyor is rotatably mounted within the drum and has a cylindrical portion disposed within the cylindrical portion of the drum and a frustoconical portion disposed within the frustoconical portion of the drum. The drive assembly is operatively coupled to the drum and the screw conveyor. The drive assembly is arranged to rotate the drum at a first speed and the screw conveyor at a second speed. The acceleration chamber is disposed within the drum and arranged to rotate with the screw conveyor. The acceleration pipe is coupled to the screw conveyor and is arranged to rotate with the screw conveyor. The acceleration pipe is disposed between the drum inlet and the acceleration chamber. The feed pipe is in flow communication with the acceleration chamber, via the drum inlet and the acceleration pipe. The acceleration pipe is adapted to receive a suspension from the feed pipe and to rotate the suspension, based on a corresponding rotation of the screw conveyor, prior to the suspension exiting the acceleration pipe and being received by the acceleration chamber.

In accordance with a second example, an acceleration pipe for use with a decanter centrifuge including a feed pipe and a screw conveyor having an acceleration chamber includes an acceleration pipe body adapted to be coupled to and rotate with the screw conveyor. The acceleration pipe body includes an acceleration pipe inlet and an acceleration pipe outlet. The acceleration pipe body defines an acceleration pipe flow path extending between the acceleration pipe inlet and the acceleration pipe outlet. The acceleration pipe body is adapted to receive a suspension at the acceleration pipe inlet from the feed pipe and to rotate the suspension, based on a corresponding rotation of the screw conveyor, prior to the suspension exiting the acceleration pipe outlet and being received by the acceleration chamber of the screw conveyor.

In accordance with a third example, a method of retrofitting a decanter centrifuge includes uncoupling a first feed pipe from a solids hub. The first feed pipe having a first feed pipe outlet. The solids hub is coupled at a first drum end of a drum. The drum includes the first drum end and a second drum end opposite the first drum end. The method includes uncoupling the solids hub from the first drum end. The method includes coupling an acceleration pipe to a screw conveyor to rotate with the screw conveyor. The acceleration pipe includes an acceleration pipe inlet, an acceleration pipe outlet, and defines an acceleration pipe flow path extending between the acceleration pipe inlet and the acceleration pipe outlet. The method includes recoupling the solids hub to the first drum end. The acceleration pipe is positioned between the solids hub and an acceleration chamber. The method includes coupling a second feed pipe having a second feed pipe outlet to the solids hub to allow the second feed pipe outlet to flow the suspension into the acceleration pipe prior to being received by the acceleration chamber of the screw conveyor.

In accordance with a fourth example, a decanter centrifuge includes a drum, a solids hub, a liquids hub, a pair of pillow blocks, a feed pipe, a screw conveyor, an acceleration pipe, and a gear assembly. The drum includes a cylindrical portion and a conical portion and includes a drum inlet, a solids outlet, and a liquid out. The drum includes a first drum end and a second drum end opposite the first drum end. The drum inlet and the solids outlet are positioned adjacent the first drum end. The liquid outlet is positioned adjacent the second drum end. The solids hub is coupled at the first drum end. The liquids hub is coupled at the second drum end. The pair of pillow blocks support the first drum end and the second drum end. The feed pipe is coupled to the solids hub and has a feed pipe outlet. The screw conveyor is disposed within the drum and has a central screw conveyor portion including an accelerator. A first screw conveyor end is disposed adjacent the first drum end and a second screw conveyor end is disposed adjacent the second drum end. The acceleration pipe is disposed within the central screw conveyor portion and is coupled to rotate with the screw conveyor. The acceleration pipe is positioned between the solids hub and the accelerator. The acceleration pipe includes an acceleration pipe inlet, an acceleration pipe outlet, and defines an acceleration pipe flow path extending between the acceleration pipe inlet and the acceleration pipe outlet. The gear assembly is positioned adjacent one of the pillow blocks and is adapted to rotate the drum and the screw conveyor at different speeds. The feed pipe outlet is disposed within or immediately adjacent the acceleration pipe inlet. The acceleration pipe is adapted to receive a suspension at the acceleration pipe inlet from the feed pipe and to rotate the suspension, based on corresponding rotation of the screw conveyor, prior to the suspension exiting the acceleration pipe outlet and being received by the accelerator of the screw conveyor.

In accordance with a fifth example, a decanter centrifuge includes a drum, a screw conveyor, a drive assembly, an acceleration chamber, an acceleration pipe, and a feed pipe. The drum includes a cylindrical portion and a conical portion. The drum includes a drum inlet, a solids outlet, and a liquid outlet. The screw conveyor is rotatably mounted within the drum and has a cylindrical portion disposed within the cylindrical portion of the drum and a conical portion disposed within the conical portion of the drum. The drive assembly is operatively coupled to the drum and the screw conveyor. The drive assembly is arranged to rotate the drum at a first speed and the screw conveyor at a second speed. The acceleration chamber is disposed within the drum and arranged to rotate with the screw conveyor. The acceleration pipe is coupled to the screw conveyor and arranged to rotate with the screw conveyor. The acceleration pipe is disposed between the drum inlet and the acceleration chamber. The feed pipe is in flow communication with the acceleration chamber, via the drum inlet and the acceleration pipe. A flow path runs from the feed pipe, through the acceleration pipe, to the acceleration chamber. The acceleration pipe is adapted to receive a suspension from the feed pipe and to rotate the suspension, based on corresponding rotation of the screw conveyor, prior to the suspension exiting the acceleration pipe and being received by the acceleration chamber.

In further accordance with the foregoing first, second, third, fourth, and/or fifth examples, an apparatus and/or method may further include any one or more of the following:

In accordance with an example, the screw conveyor includes a hub, and the acceleration pipe is coupled to the hub.

In accordance with another example, the acceleration pipe includes an exterior surface defining mounting holes, and the decanter centrifuge further includes a plurality of fasteners. Each fastener is received within a respective mounting hole and couples the acceleration pipe to the hub.

In accordance with another example, the acceleration pipe is an integral body.

In accordance with another example, the acceleration pipe has an acceleration pipe inlet, an acceleration pipe outlet, and an interior surface that encircles a flow path defined by the acceleration pipe.

In accordance with another example, the interior surface tapers toward the acceleration pipe inlet.

In accordance with another example, the interior surface widens toward the acceleration pipe outlet.

In accordance with another example, the interior surface is frustoconical.

In accordance with another example, the interior surface is inwardly tapered at a relatively consistent slope between the acceleration pipe outlet and the acceleration pipe inlet.

In accordance with another example, the interior surface has one or more tapered surfaces each having an angle of between about 0.5 degrees and about 6 degrees relative to a longitudinal axis of the acceleration pipe.

In accordance with another example, the interior surface includes projections that are adapted to encourage the flow of the suspension from the acceleration pipe inlet to the acceleration pipe outlet.

In accordance with another example, the acceleration pipe includes an inlet end, an outlet end, and an exterior surface extending between the inlet end and the outlet end. The exterior surface defines a circumferential groove at each of the inlet end and the outlet end.

In accordance with another example, the acceleration pipe includes an outer body, an inner body, and a pair of end caps defining through holes. The end caps are coupled at ends of the outer body, and the inner body extends through the outer body and out of the through holes of the end caps.

In accordance with another example, the inner body includes a first frustoconical portion having a first taper and a second frustoconical portion having a second taper.

In accordance with another example, the screw conveyor includes the acceleration pipe.

In accordance with another example, the acceleration pipe body has an interior surface that encircles the acceleration pipe flow path and extends between the acceleration pipe inlet and the acceleration pipe outlet. The interior surface being inwardly tapered toward the acceleration pipe inlet.

In accordance with another example, the interior surface includes a first tapered portion having a first angle relative to a longitudinal axis of the acceleration pipe body and a second tapered portion having a second angle relative to the longitudinal axis of the acceleration pipe body.

In accordance with another example, further including forming the second feed pipe by shortening a length of the first feed pipe.

In accordance with another example, further including balancing the decanter centrifuge.

Further, while several examples have been disclosed herein, any features from any examples may be combined with or replaced by other features from other examples. Moreover, while several examples have been disclosed herein, changes may be made to the disclosed examples within departing from the scope of the claims.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A decanter centrifuge, comprising:

a drum including a cylindrical portion and a frustoconical portion, the drum including a drum inlet, a solids outlet, and a liquid outlet;

a screw conveyor rotatably mounted within the drum and having a cylindrical portion disposed within the cylindrical portion of the drum and a frustoconical portion disposed within the frustoconical portion of the drum;

a drive assembly operatively coupled to the drum and the screw conveyor, the drive assembly arranged to rotate the drum at a first speed and the screw conveyor at a second speed;

an acceleration chamber disposed within the drum and arranged to rotate with the screw conveyor;

an acceleration pipe coupled to the screw conveyor and arranged to rotate with the screw conveyor, the acceleration pipe disposed between the drum inlet and the acceleration chamber, and the acceleration pipe including an inlet end, an outlet end, and an exterior surface extending between the inlet end and the outlet end, wherein the exterior surface defines a circumferential groove at each of the inlet end and the outlet end; and a feed pipe in flow communication with the acceleration chamber, via the drum inlet and the acceleration pipe, wherein the acceleration pipe is adapted to receive a suspension from the feed pipe and to rotate the suspension, based on a corresponding rotation of the screw conveyor, prior to the suspension exiting the acceleration pipe and being received by the acceleration chamber.

2. The decanter centrifuge of claim 1, wherein the screw conveyor comprises a hub, and the acceleration pipe is coupled to the hub.

3. The decanter centrifuge of claim 2, wherein the exterior surface defines mounting holes, and the decanter centrifuge further comprises a plurality of fasteners, each fastener received within a respective mounting hole and coupling the acceleration pipe to the hub.

4. The decanter centrifuge of claim 1, wherein the acceleration pipe is an integral body.

5. The decanter centrifuge of claim 1, wherein the acceleration pipe has an acceleration pipe inlet, an acceleration pipe outlet, and an interior surface that encircles a flow path defined by the acceleration pipe.

6. The decanter centrifuge of claim 5, wherein the interior surface tapers toward the acceleration pipe inlet.

7. The decanter centrifuge of claim 5, wherein the interior surface widens toward the acceleration pipe outlet.

8. The decanter centrifuge of claim 5, wherein the interior surface is frustoconical.

9. The decanter centrifuge of claim 5, wherein the interior surface is inwardly tapered at a relatively consistent slope between the acceleration pipe outlet and the acceleration pipe inlet.

10. The decanter centrifuge of claim 5, wherein the interior surface has one or more tapered surfaces each having an angle of between about 0.5 degrees and about 6 degrees relative to a longitudinal axis of the acceleration pipe.

11. The decanter centrifuge of claim 5, wherein the interior surface comprises projections that are adapted to encourage the flow of the suspension from the acceleration pipe inlet to the acceleration pipe outlet.

12. A decanter centrifuge, comprising:

a drum including a cylindrical portion and a frustoconical portion, the drum including a drum inlet, a solids outlet, and a liquid outlet;

a screw conveyor rotatably mounted within the drum and having a cylindrical portion disposed within the cylindrical portion of the drum and a frustoconical portion disposed within the frustoconical portion of the drum;

a drive assembly operatively coupled to the drum and the screw conveyor, the drive assembly arranged to rotate the drum at a first speed and the screw conveyor at a second speed;

an acceleration chamber disposed within the drum and arranged to rotate with the screw conveyor;

an acceleration pipe coupled to the screw conveyor and arranged to rotate with the screw conveyor, the acceleration pipe disposed between the drum inlet and the acceleration chamber, wherein the acceleration pipe comprises an outer body, an inner body, and a pair of end caps defining through holes, and wherein the end caps are coupled at ends of the outer body, and the inner body extends through the outer body and out of the through holes of the end caps; and a feed pipe in flow communication with the acceleration chamber, via the drum inlet and the acceleration pipe, wherein the acceleration pipe is adapted to receive a suspension from the feed pipe and to rotate the suspension, based on a corresponding rotation of the screw conveyor, prior to the suspension exiting the acceleration pipe and being received by the acceleration chamber.

13. The decanter centrifuge of claim 12, wherein the inner body includes a first frustoconical portion having a first taper and a second frustoconical portion having a second taper.

14. An acceleration pipe for use with a decanter centrifuge including a feed pipe and a screw conveyor having an acceleration chamber, the acceleration pipe comprising:

an acceleration pipe body adapted to be coupled to and rotate with the screw conveyor, the acceleration pipe body comprising:

an inlet end including an acceleration pipe inlet;

an outlet end including an acceleration pipe outlet;

an exterior surface extending between the inlet end and the outlet end, wherein the exterior surface defines a circumferential groove at each of the inlet end and the outlet end; and the acceleration pipe body defining an acceleration pipe flow path extending between the acceleration pipe inlet and the acceleration pipe outlet, wherein the acceleration pipe body is adapted to receive a suspension at the acceleration pipe inlet from the feed pipe and to rotate the suspension, based on a corresponding rotation of the screw conveyor, prior to the suspension exiting the acceleration pipe outlet and being received by the acceleration chamber of the screw conveyor.

15. The acceleration pipe of claim 14, wherein the acceleration pipe body has an interior surface that encircles the acceleration pipe flow path and extends between the acceleration pipe inlet and the acceleration pipe outlet, the interior surface being inwardly tapered toward the acceleration pipe inlet.

16. The acceleration pipe of claim 15, wherein the interior surface includes a first tapered portion having a first angle relative to a longitudinal axis of the acceleration pipe body and a second tapered portion having a second angle relative to the longitudinal axis of the acceleration pipe body.

17. The acceleration pipe of claim 15, wherein the interior surface comprises projections that are adapted to encourage the flow of the suspension from the acceleration pipe inlet to the acceleration pipe outlet.

18. The acceleration pipe of claim 15, wherein the interior surface is inwardly tapered at a relatively consistent slope between the acceleration pipe outlet and the acceleration pipe inlet.

19. The acceleration pipe of claim 15, wherein the interior surface has one or more tapered surfaces each having an angle of between about 0.5 degrees and about 6 degrees relative to a longitudinal axis of the acceleration pipe.

20. The acceleration pipe of claim 15, wherein the interior surface is frustoconical.

* * * * *